UNITED STATES PATENT OFFICE

FRANK Y. CROMWELL, OF ERIE, PENNSYLVANIA.

DISINFECTANT.

SPECIFICATION forming part of Letters Patent No. 326,479, dated September 15, 1885.

Application filed November 22, 1884. (Specimens.)

*To all whom it may concern:*

Be it known that I, FRANK Y. CROMWELL, a citizen of the United States, residing at Erie, in the county of Erie and State of Pennsylvania, have invented a certain new and useful Composition of Matter to be used for Disinfecting Urinals, Closets, Sinks, &c.; and I do hereby declare the following to be a full, clear, and exact description of the invention, such as will enable others skilled in the art to which it appertains to make and use the same.

The objects of my invention are, first, to form a disinfecting compound of constituent parts, substantially as hereinafter described; second, to compound a disinfecting composition of constituent parts substantially as hereinafter stated, and reduce the same to a semi-porous solid in the form of cakes suitable to be placed in urinals, sinks, and other receptacles for the purpose of disinfecting the same.

My composition consists of the following ingredients combined substantially in the proportions following, viz: Caustic soda, twelve parts; water, twenty-four parts; commercial sulphate of iron, three parts; gum-camphor, four parts; oil of tar, one part; pulverized charcoal, twelve parts.

The ingredients are thoroughly mixed and formed into cakes of the compound in the following manner, viz: Dissolve the caustic soda in substantially double its volume of water heated to nearly the boiling-point, after which pulverize the commercial sulphate of iron and add it thereto. Then pulverize the gum-camphor and add it thereto, after which add the oil of tar, and, finally, the pulverized charcoal, these ingredients being thoroughly stirred together and intermingled, the heat being meanwhile kept up near to the boiling-point, and the mixture being thoroughly intermingled by the stirring thereof. The compound thus formed is then poured off into molds of suitable size and shape where it is allowed to cool and harden, so that when removed from the molds it is in shape and condition for use.

In using the above-named compound, one or more cakes thereof as may be desired is placed in the urinal, sink, or other receptacle to be disinfected, where it is subjected to the action of water and other fluids therein which slowly disintegrates and dissolves the compound, thereby liberating the disinfecting ingredients thereof which act upon the fluids in the urinal, sink, &c., and disinfect and destroy all the foul odors arising therefrom so long as any portion of the compound remains therein.

By the use of this composition, substantially as above described, in a urinal, sink, or other foul receptacle, the same will thoroughly disinfect and destroy all foul odor arising therefrom so long as any portion of the compound remains therein, which will ordinarily be several weeks, the time depending, however, somewhat on the amount of use the urinal or sink is put to, as the compound, made as hereinbefore described, disintegrates and dissolves very slowly.

I am aware that the proportions of the ingredients of my compound may be varied. Therefore I do not desire to limit myself to the exact proportions named in the compounding thereof.

Having thus described my invention, what I claim, and desire to secure by Letters Patent of the United States, is—

The herein-described composition of matter for disinfecting purposes, consisting of caustic soda, water, commercial sulphate of iron, gum-camphor, oil of tar, and pulverized charcoal, in the proportions substantially as specified, molded into solid cakes, substantially as set forth.

In testimony whereof I affix my signature in presence of two witnesses.

FRANK Y. CROMWELL.

Witnesses:
SELDEN MARVIN,
H. M. STURGER.